(12) United States Patent
Weind

(10) Patent No.: US 7,032,533 B2
(45) Date of Patent: Apr. 25, 2006

(54) WINDSHIELD INSERT

(76) Inventor: Raymond Weind, 255 Newport Drive, Ste. 325, British Columbia (CA) V3H 5H1

( * ) Notice: Subject to any disclaimer, the term of this patent is extended or adjusted under 35 U.S.C. 154(b) by 0 days.

(21) Appl. No.: 10/837,235

(22) Filed: Apr. 30, 2004

(65) Prior Publication Data

US 2005/0242611 A1   Nov. 3, 2005

(51) Int. Cl.
*B63B 17/00* (2006.01)
(52) U.S. Cl. .................. 114/361; 114/177; 296/145
(58) Field of Classification Search ............ 114/177, 114/361, 364; 15/250.3, 250.34, 250.38, 15/250.44; 296/145
See application file for complete search history.

(56) References Cited

U.S. PATENT DOCUMENTS

| | | | | |
|---|---|---|---|---|
| 3,336,612 A | * | 8/1967 | Stevens | 114/361 |
| 3,448,480 A | * | 6/1969 | Couget | 15/250.3 |
| 3,810,267 A | * | 5/1974 | Fussell et al. | 114/361 |
| 4,415,196 A | * | 11/1983 | Baum et al. | 15/250.3 |
| 4,706,599 A | | 11/1987 | Johnson | 114/361 |
| 5,325,807 A | * | 7/1994 | Hidekura | 114/361 |
| 5,327,614 A | * | 7/1994 | Egner-Walter et al. | 15/250.34 |
| 5,709,163 A | | 1/1998 | Livingston | 114/211 |
| 6,324,719 B1 | * | 12/2001 | Ritacco | 15/250.3 |

* cited by examiner

*Primary Examiner*—Lars A. Olson
(74) *Attorney, Agent, or Firm*—Thelen Reid & Priest LLP

(57) ABSTRACT

An insert for a plastic windshield of a boat, including an inner frame; an outer frame; a glass panel supported by said outer frames; and a washer and wiper assembly mounted on said glass panel. The insert allows users to operate a boat from an upper helm in adverse weather conditions.

18 Claims, 9 Drawing Sheets

WINDSHIELD INSERT

BACKGROUND OF THE INVENTION

1. Field of the Invention

This invention relates to windshields for boats, and more specifically to glass inserts for such windshields.

2. Background

The helm of a boat is, among other things, the location from which the speed and direction of the boat is controlled. In most pleasure craft, the helm is positioned either "above" or "below" the deck, and in many cases, a boat is provided with both above and below helms (typical in boats 25' or longer).

The helms below the deck provide less field of vision compared to "above" helms, but are usually protected from the elements by glass windows. The above helms are typically open to the environment, which can make navigating the craft difficult in less than ideal weather conditions. One partial solution to the exposure to the environment is to add a bimini top to the helm to protect the helm from the environment.

Another solution in the prior art for protecting operators of the boat in an above helm is to use a flexible plastic windshield around the helm to protect the operator from the environment. The windshield is formed of a series of plastic panels which are maintained in place by zippers. The difficulty with this approach is that frequently the plastic windshield will become fogged or covered with rain or other elements, which are very difficult to remove, thus making it challenging for the operator to see outside the helm in less than ideal weather conditions.

Prior art includes U.S. Pat. No. 5,709,163 to Livingston for a Cockpit of a Boat with Fresh Air Vents and U.S. Pat. No. 4,706,599 to Johnson for a Boat Cockpit Enclosure.

BRIEF SUMMARY OF THE INVENTION

An insert for a flexible plastic windshield is provided, comprising an inner frame; an outer frame; a glass panel supported by said inner and outer frames; and a wiper assembly mounted on said glass panel. The insert may include a trough on the outer edge of the inner frame for receiving and supporting a water hose and a wire. The insert may also include a plurality of raised lines on the outer side of the inner frame and on the inner side of the outer frame for gripping a flexible plastic windshield and may also include a trench in the inner side of said outer frame for receiving bolts through apertures in the inner frame.

The inner side of the inner frame of the insert may be marked at points corresponding to the trench. The insert may also have first and second supports, each having first and second ends, the first end of each of the supports securable to the insert, and the second end of each of the supports securable to a helm.

DETAILED DESCRIPTION OF THE INVENTION

Figure 1:
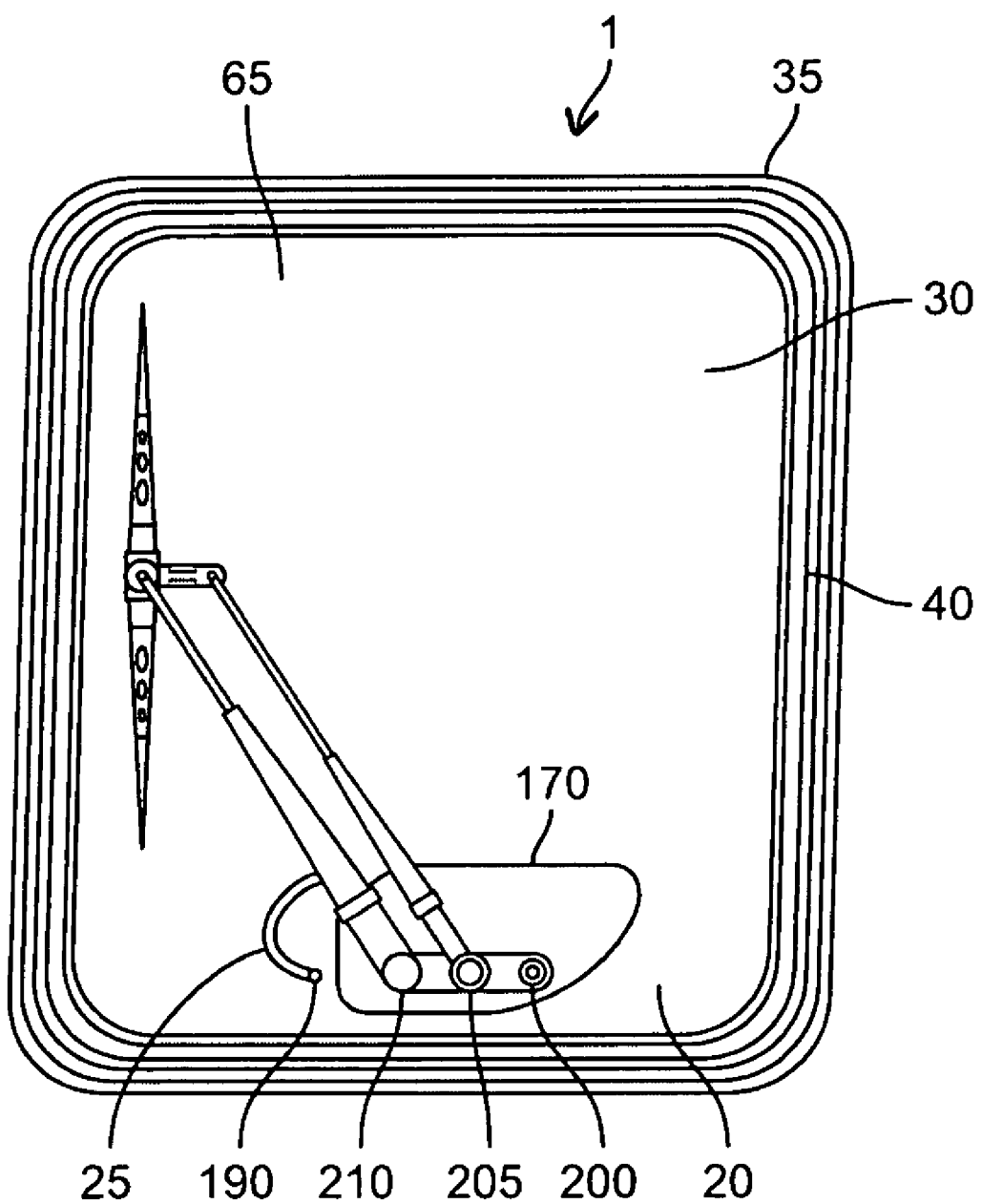
FIG. 1 is a front view of a windshield insert according to the invention.
Figure 2:
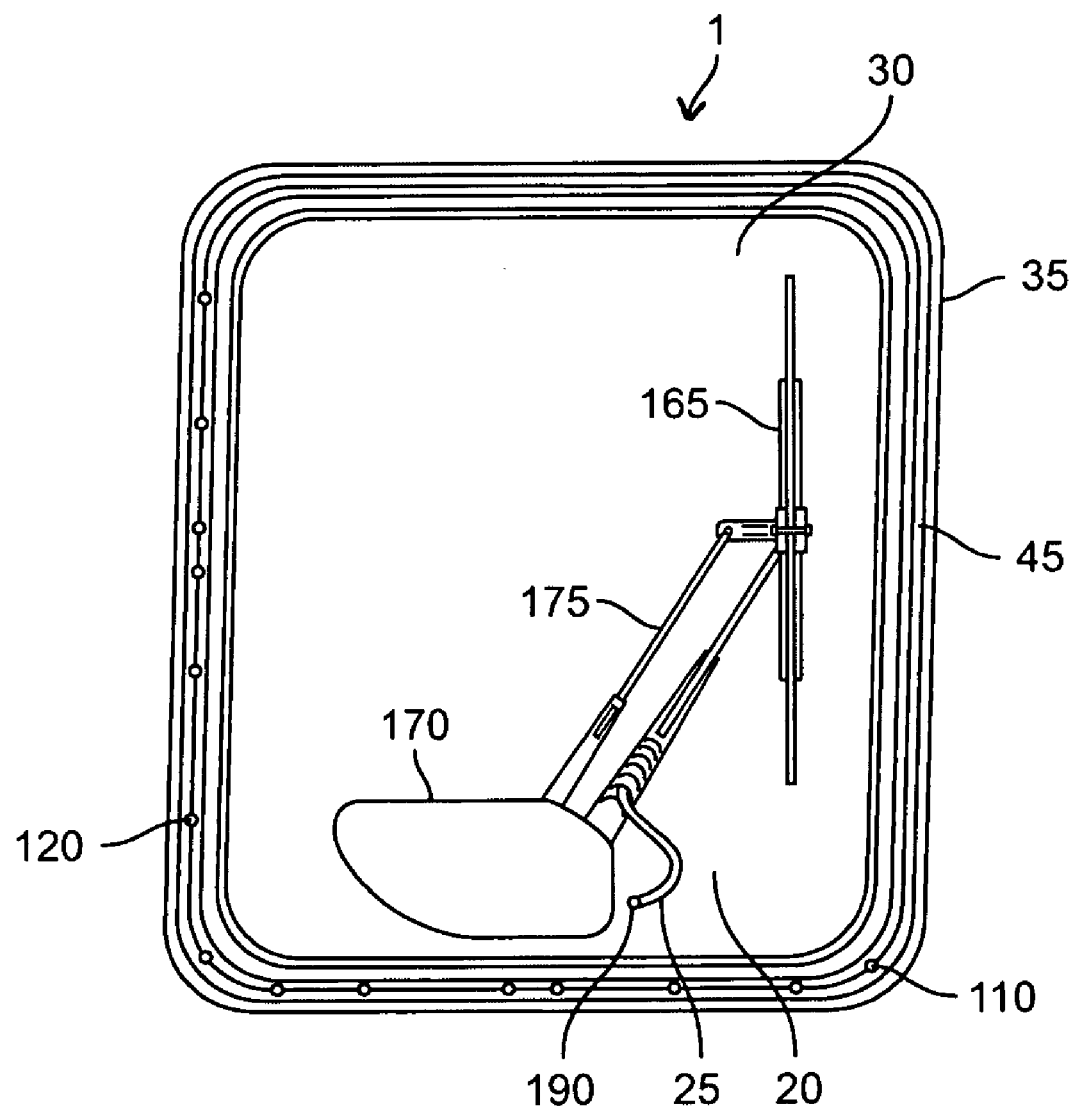
FIG. 2 is a rear view thereof.
Figure 3:
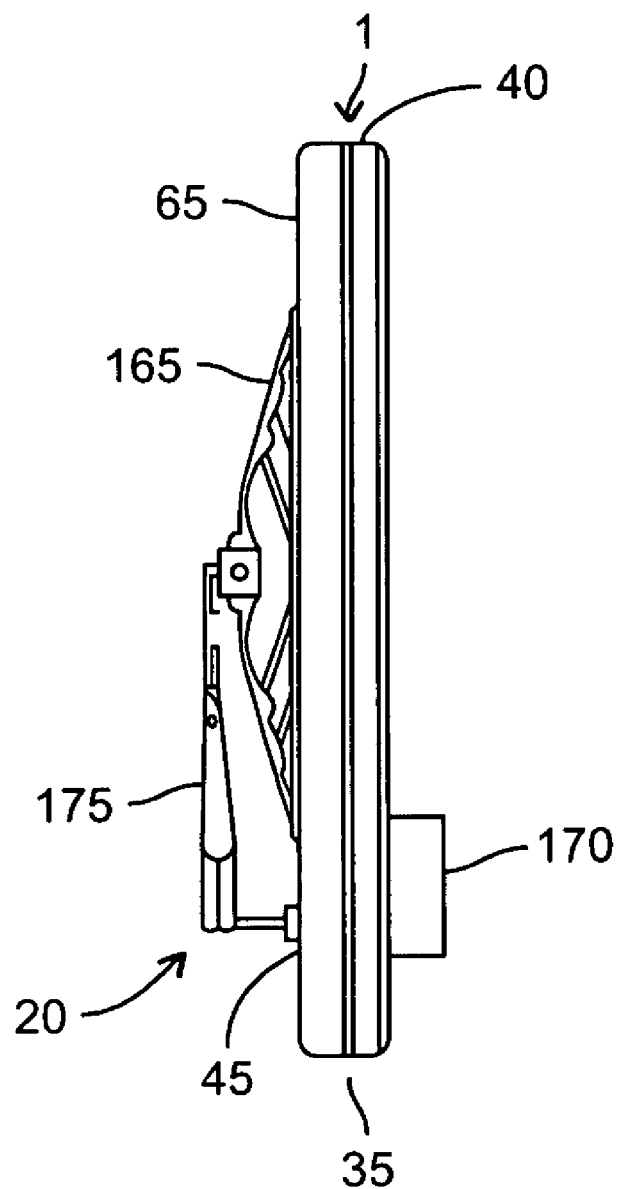
FIG. 3 is a side view thereof.
Figure 4:
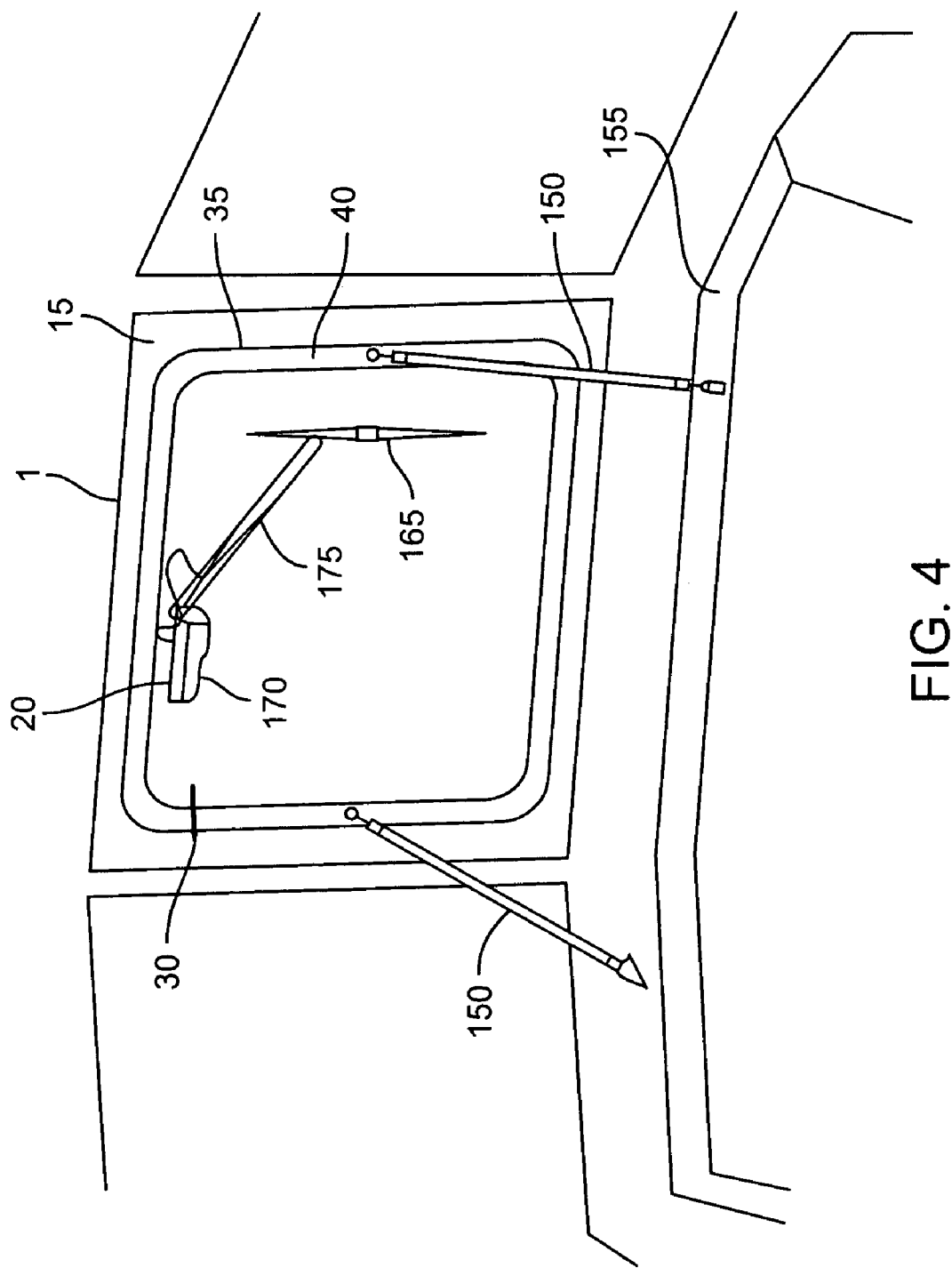
FIG. 4 a perspective view showing the insert placed on a boat.
Figure 5:
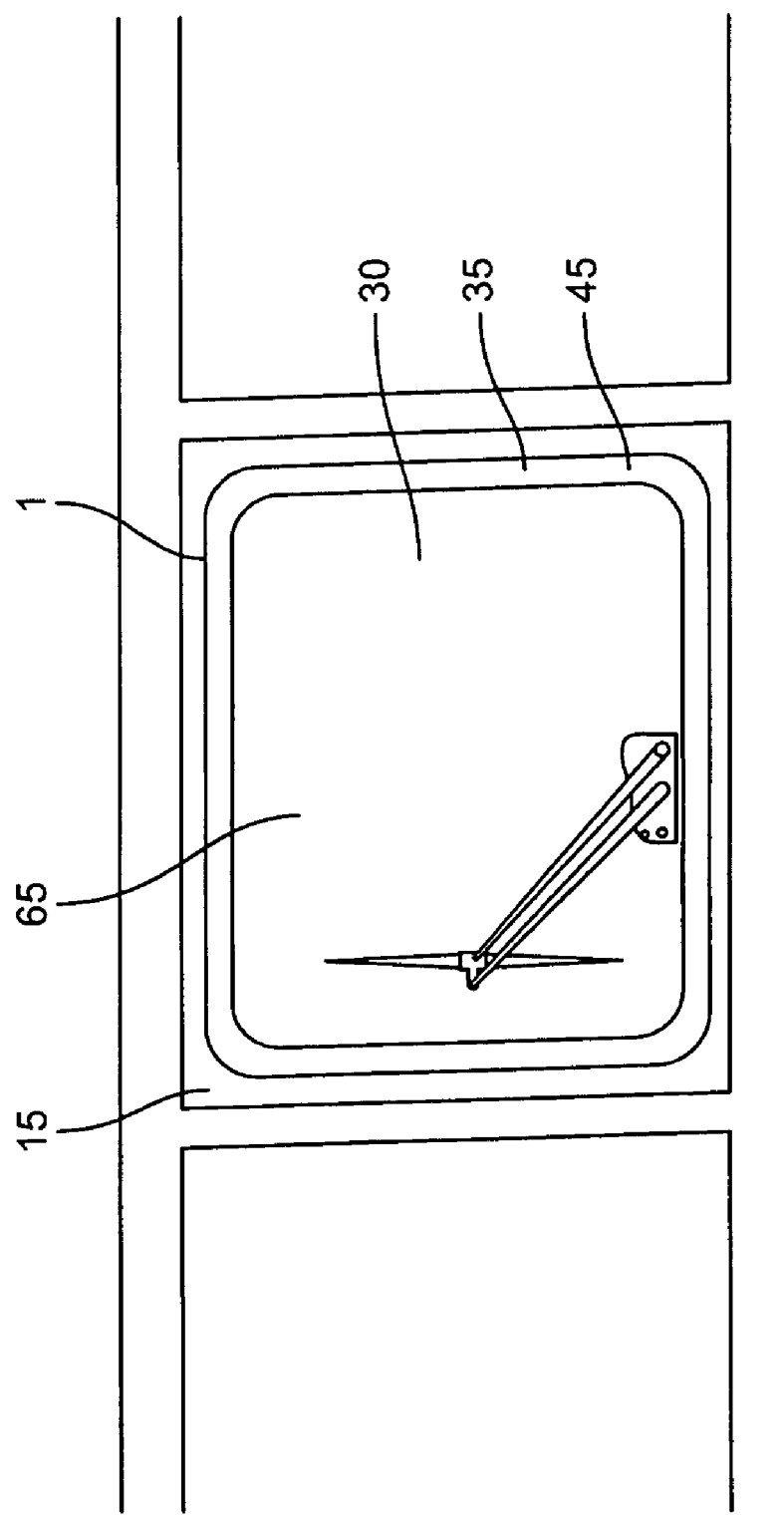
FIG. 5 is a front view thereof.

| Reference Table | |
|---|---|
| PART | REFERENCE NUMBER |
| Insert | 1 |
| Flexible plastic windshield | 15 |
| Window wiper assembly | 20 |
| Window washer | 25 |
| Glass panel | 30 |
| Frame | 35 |
| Inner frame | 40 |
| Outer frame | 45 |
| Inner side of outer frame | 50 |
| Inner side of inner frame | 52 |
| Outer side of inner frame | 55 |
| Inner side of glass panel | 60 |
| Outside surface of glass panel | 65 |
| Top of inner frame | 70 |
| Tube | 75 |
| Trench | 100 |
| Bolt | 110 |
| Aperture | 120 |
| Raised Line | 130 |
| Outer trough | 135 |
| Hose | 140 |
| Wires | 145 |
| Supports | 150 |
| Helm | 155 |
| Bimini roof | 160 |
| Wiper blade | 165 |
| Wiper motor | 170 |
| Wiper arm | 175 |
| Outer edge of inner frame | 180 |
| Markings | 185 |
| Aperture in panel | 190 |
| Set screws | 200 |
| Support end | 210 |
| Base | 215 |
| Support aperture | 220 |
| Base aperture | 225 |
| Slot | 230 |
| Support member | 235 |
| Gripping member | 240 |
| Screw | 245 |
| Support Arm | 250 |
| Ledge | 255 |

The invention, as seen in FIGS. 1 through 5, comprises a glass windshield insert 1 for positioning within a flexible plastic windshield 15. Insert 1 comprises glass panel 30 positioned in frame 35. Panel 30 is preferably tempered safety glass and is 3/16" thick. Secured to panel 30 is window wiper assembly 20 and window washer 25 to assist in the removal of water or other elements from the outside surface 65 of panel 30.

Figure 6:
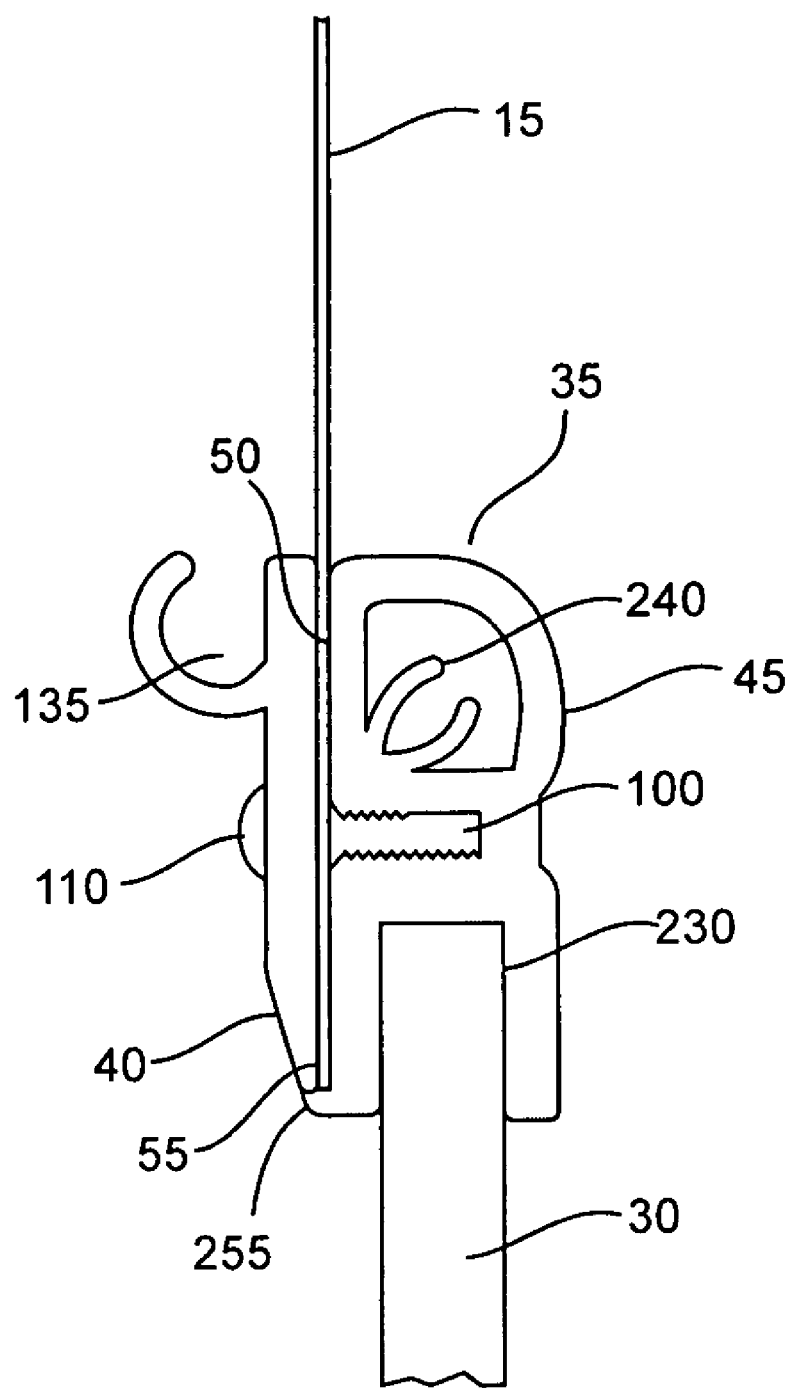
FIG. 6 is a cutaway partial side view of the frame holding a flexible plastic windshield.

Frame 35 includes inner frame 40 and outer frame 45. The terms "inner" and "outer" as used in this document relate to the positioning of the item in question to the helm. For example inner frame 40 is the portion of frame 35 on the helm side of windshield 15 and outer frame 45 is positioned on the outside of the windshield. Glass panel 30 is held in place by outer frame 45 using conventional means, as seen in FIG. 6. Preferably a vinyl gasket (not shown) is inserted into slot 230 before glass panel 30, to tightly hold glass panel 30 in place.

Figure 11:
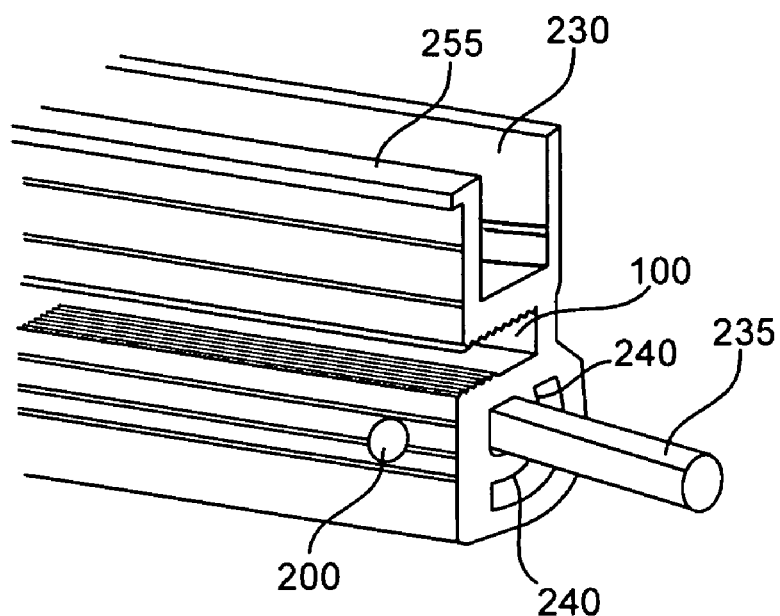
FIG. 11 is a perspective view of a portion of the outer frame thereof showing the connecting member.

As seen in FIG. 11, outer frame 45 is assembled using a pin and set screw system. Outer frame 45 is preferably provided in two parts. A pin and set screw system is used to hold the two parts together without requiring less aesthetic clamps or the like. Two use the pin and set screw system, pin 235 is placed within gripping members 240 so that pin 235 is approximately half way within one part of outer frame 45. Set screws 200 are then placed in apertures positioned to allows set screws 200 to frictionally engage pin 235, holding pin 235 in place. The other part of outer frame 45 is then positioned alongside the first part such that pin 235 is partially within the other part and is held by holding members 40. Then set screws 200 are used to frictionally engage pin 235 as previously described.

Figure 8:
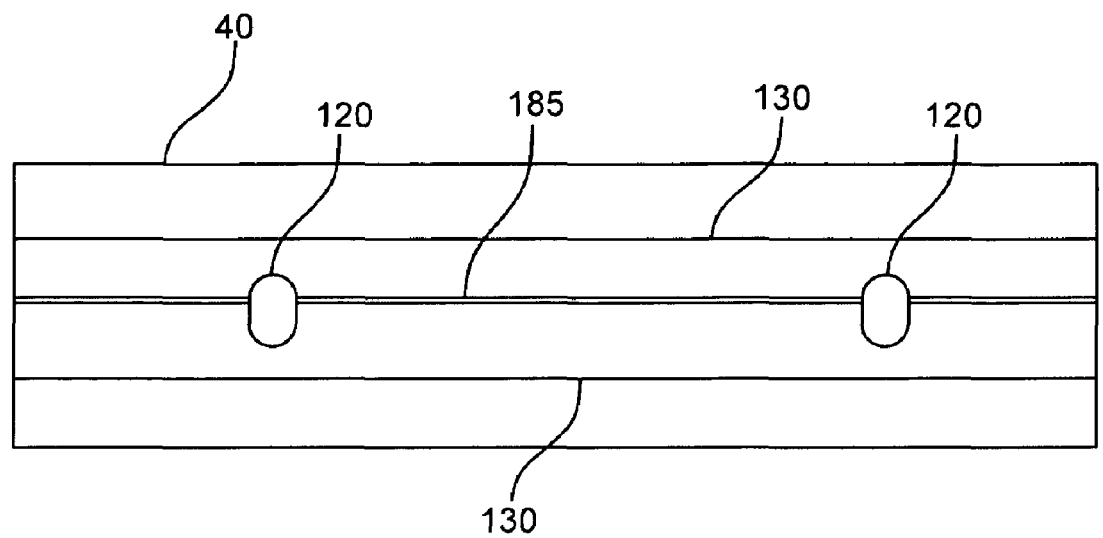
FIG. 8 is a partial front view thereof.

With further reference to FIG. 6, plastic windshield 15 is secured between inner frame 40 and outer frame 45 by bolts 110. Inner side 50 of outer frame 45 has trench 100 running throughout. Trench 100 is shaped to receive a bolt 110 placed through apertures 120 in inner frame 40. Trench 100 preferably runs through the entire length of inner side 50 of outer frame 45 in the approximate center of outer frame 45 and is aligned with apertures 120, although in alternative embodiments, trench 100 may be placed intermittently along inner side 50. As seen in FIG. 8, markings 185 on the surface of inner side 52 of inner frame 40 correspond with the location of trench 100 thereby allowing new apertures 120 to the created that align with trench 100.

Figure 9:
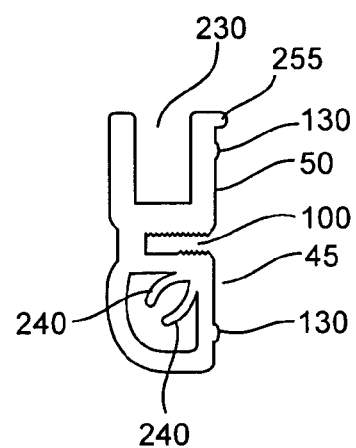
FIG. 9 is a cross sectional side view of the outer frame.
Figure 10:
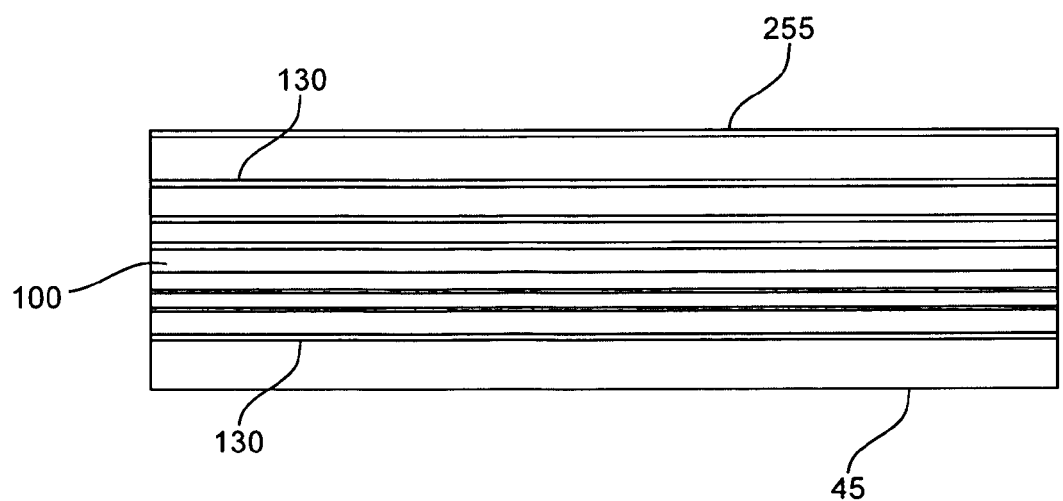
FIG. 10 is a partial rear view thereof.

As seen in FIGS. 8 and 10, inner side 50 of outer frame 45 and outer side 55 of inner frame 40 have a plurality of raised lines 130. Raised lines 130 help frame 35 grip windshield 15. As windshield 15 is flexible plastic, raised lines 130 force windshield 15 to conform to the surface of inner frame 40 and outer frame 45 thereby strengthening the grip of frame 35 to windshield 15. Windshield 15 fits against ledge 255 on outer frame 45 as seen in FIGS. 9 and 10, which further assists in holding windshield 15 in place.

Insert 1 can be provided in a variety of sizes to fit different windshields. As windshield 15 is typically provided in a variety of flexible plastic panels, frame 35 is preferably sized to fit within a single panel, with at least 1" margin of plastic all around frame 35.

Figure 7:
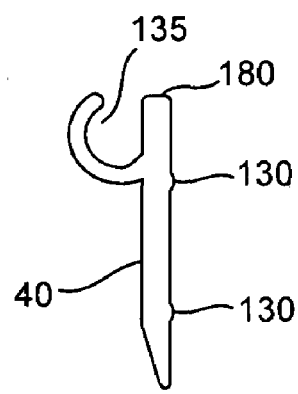
FIG. 7 is a cross sectional side view of the inner frame.

As seen in FIG. 7, outer edge 180 of inner frame 40 has trough 135 for receiving wires 145 for wiper assembly 20 and hose 140 for window washer 25. Tubes 75 may be positioned in trough 135 to support and hold wires 145 to frame 40. Tube 75 is preferably made of a hardened material such as steel. Inner frame 40, as in the case of outer frame 45, is preferably manufactured in two pieces, and tube 75 may be used to assist in holding the two pieces of inner frame 40 together, using set screws as described above in association with outer frame 45. Preferably the set screws frictionally engage tube 75 from below so that they are not easily visible.

Figure 12:
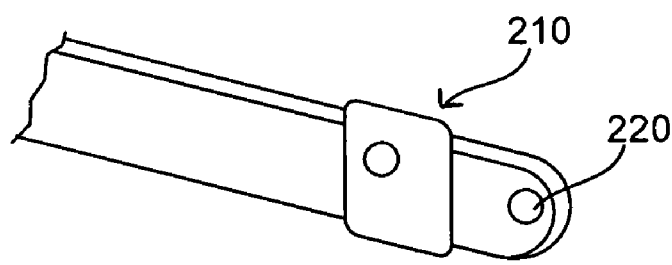
FIG. 12 is a perspective view of a support and base therefor.
Figure 12:
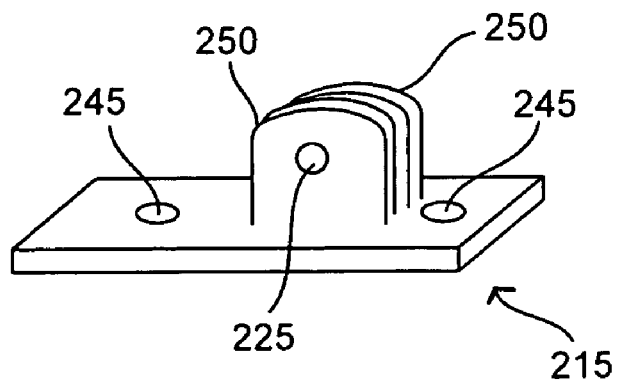

Supports 150 affix to frame 35 and help hold frame 35 in place (as windshield 15 is flexible, the weight of insert 1 may otherwise cause windshield 15 to sag). Supports 150 are preferably affixed to helm 155 by screws, bolts or other conventional means, but alternatively can be affixed to a roof 160, for example if a hard top bimini roof has been installed. As seen in FIG. 12, in a preferred embodiment, an end 210 of support 150 is secured to support base 215. Support aperture 220 is positioned between support arms 250 and aligned with base aperture 225 and held in place by a screw or pin. Base 215 is affixed to helm 155 or roof 160 by use of screws 245. Supports 150 are hollow and can be used as a conduit for wires 145 and hose 140.

Wires 145 should run from wiper assembly 20 to helm 155 in order for wiper assembly 20 to receive power. In an alternative embodiment, wiper assembly 20 could be powered by batteries. Hose 140 runs from washer 25 to helm 155 to receive water or washing fluid. Both hose 140 and wires 145 can run along the edge of inner frame 40 to avoid unsightly wires and 145 hose 140 cluttering the helm 155. Hose 140 should connect a pump on the vessel to an aperture 190 in panel 30 which leads the hose to washer 25.

Wiper assembly 20 is affixed to panel 30 and includes motor 170, arm 175 and blade 165. Motor 170 is secured to panel 30 by conventional means such as bolts 200, 205 and 210. Bolt 200 affixes motor 170 to panel 30. Wiper arms 175 are pivotally secured to bolts 205 and 210. Blade 165 is conventionally attached to wipers arms 175.

Installation

Insert 1 will typically be provided in a kit form for installation by boat owners or users. To install insert 1, the following steps are take:

(a) Inner frame 40 is placed on windshield 15 for optimum line of sight and visibility. A line is traced along the inside edge of inner frame 40 (although outside edge of inner frame 40 could also be used).

(b) Windshield 15 is preferably removed from helm 155, then cut along the traced line. There should be sufficient plastic to allow inner frame 40 and outer frame 45 to grip windshield 15.

(c) Inner frame 40 is then secured to outer frame 45 using bolts 110 such that windshield 15 is held between the frames. If necessary apertures 120 are drilled in inner frame along markings 185. Windshield 15 is then repositioned on helm 155.

(d) Support bases are positioned on helm 155. One end of each support 150 is bolted to opposite sides of inner frame 40 using apertures 120. The other end of each support 150 is attached to support base 215 to support insert 1.

(e) Hose 140 is connected to aperture 190 and run along trough 135, then through support 150 to a pump.

(f) Wires 145 are run through trough 135, then through support 150 to a power supply on the helm.

Although the particular preferred embodiments of the invention have been disclosed in detail for illustrative purposes, it will be recognized that variations or modifications of the disclosed apparatus lie within the scope of the present invention.

What is claimed is:

1. An insert for a plastic windshield, comprising
   (a) an inner frame having an outer edge;
   (b) an outer frame;
   (c) a glass panel supported by said outer frame;
   (d) a wiper assembly mounted on said glass panel; and
   (e) a trough in said outer edge of said inner frame for receiving and supporting a water hose for a washer.

2. The insert of claim 1 wherein said trough further supports and receives a wire for said wiper assembly.

3. The insert of claim 1 wherein an outer side of said inner frame and an inner side of said outer frame each have a raised line for gripping a flexible plastic windshield between said inner frame and said outer frame.

4. The insert of claim 3 further comprising a trench in said inner side of said outer frame for receiving a bolt through an aperture in said inner frame.

5. The insert of claim 4 wherein said inner side of said inner frame is marked at a plurality of points corresponding to said trench.

6. The insert of claim 3 further comprising a trench in said inner side of said outer frame for receiving a bolt through an aperture in said inner frame.

7. The insert of claim 4 wherein said inner side of said inner frame is marked at a plurality of points corresponding to said trench.

8. The insert of claim 1 further comprising:
first and second supports, each having first and second ends, the first end of each of said supports securable to said insert, and the second end of each of said supports securable to a boat.

9. The insert of claim 1 wherein said wiper assembly comprises a motor, a wiper arm and a wiper blade.

10. The insert of claim 1 wherein said insert is secured to a plastic windshield on a boat.

11. The insert of claim 1 wherein said plastic windshield is secured between said inner frame and said outer frame by a plurality of bolts.

12. A method of installing an insert in a plastic windshield, said insert comprising an inner frame having an outer edge; an outer frame; a glass panel supported by said outer frames; a trough within said outer edge of said inner frame, and a wiper assembly mounted on said glass panel, said method comprising:
cutting an aperture in said windshield;
using a plurality of bolts to attach said inner frame to said outer frame such that said plastic windshield along an edge of said aperture is held by said inner and outer frame;
attaching a first end of a support to said inner frame and a second end of said support to a helm; and
connecting a wire from said helm to said wiper assembly and positioning at least a portion of said wire within said trough.

13. The method of claim 12 wherein said insert further comprises a washer secured to said panel, further comprising:
connecting a hose from a pump to said washer; and
positioning at least a portion of said hose within said trough.

14. The method of claim 13 wherein an outer side of said inner frame and an inner side of said outer frame each have a raised line for gripping a flexible plastic windshield between said inner frame and said outer frame.

15. The method of claim 14 wherein said bolts passing through an aperture on said inner frame and secure to a trench on an inner side of said outer frame.

16. The method of claim 15 further comprising the step of:
making said apertures by drilling a hole on a marking on said inner frame.

17. An insert for a plastic windshield, comprising:
(a) an inner frame having an outer edge with a trough for receiving and supporting a water hose and wire, said inner frame having an inner side marked at a plurality of points;
(b) an outer frame having an inner side with a trench for receiving a bolt through an aperture in said inner frame, said trench corresponding to said markings;
(c) a glass panel supported by said outer frames;
(d) a wiper assembly mounted on said glass panel, said wiper assembly comprising a motor, a wiper arm and a wiper blade;
(e) first and second supports, each having first and second ends, the first end of each of said supports securable to said insert, and the second end of each of said supports securable to a boat;
wherein an outer side of said inner frame and an inner side of said outer frame each have a raised line for gripping a flexible plastic windshield between said inner frame and said outer frame.

18. An insert for a plastic windshield, comprising
(a) an inner frame;
(b) an outer frame;
(c) a glass panel supported by said outer frame;
(d) a wiper assembly mounted on said glass panel;
wherein an outer side of said inner frame and an inner side of said outer frame each have a raised line for gripping a flexible plastic windshield between said inner frame and said outer frame.

* * * * *